(12) United States Patent  
Meijering et al.

(10) Patent No.: US 11,630,303 B2
(45) Date of Patent: Apr. 18, 2023

(54) MULTI-DEPTH AUGMENTED REALITY DISPLAY

(71) Applicants: JAGUAR LAND ROVER LIMITED, Coventry (GB); CAMBRIDGE ENTERPRISE LIMITED, Cambridge (GB)

(72) Inventors: Valerian Meijering, Coventry (GB); Robert Hardy, Coventry (GB); Kun Li, Cambridge (GB); Ali Yöntem, Cambridge (GB); Daping Chu, Cambridge (GB)

(73) Assignees: JAGUAR LAND ROVER LIMITED, Coventry (GB); CAMBRIDGE ENTERPRISE LIMITED, Cambridge (GB)

(*) Notice: Subject to any disclaimer, the term of this patent is extended or adjusted under 35 U.S.C. 154(b) by 449 days.

(21) Appl. No.: 16/465,085

(22) PCT Filed: Nov. 29, 2017

(86) PCT No.: PCT/EP2017/080873
§ 371 (c)(1),
(2) Date: May 29, 2019

(87) PCT Pub. No.: WO2018/100003
PCT Pub. Date: Jun. 7, 2018

(65) Prior Publication Data
US 2019/0317326 A1    Oct. 17, 2019

(30) Foreign Application Priority Data
Nov. 30, 2016  (GB) ..................... 1620340

(51) Int. Cl.
G02B 27/01    (2006.01)
H04N 13/344   (2018.01)
(Continued)

(52) U.S. Cl.
CPC ......... *G02B 27/0103* (2013.01); *G02B 27/01* (2013.01); *G02B 27/0179* (2013.01);
(Continued)

(58) Field of Classification Search
CPC ............ G02B 27/0103; G02B 27/0179; G02B 27/0101; G02B 27/01; G02B 27/0075;
(Continued)

(56) References Cited

U.S. PATENT DOCUMENTS

| 2001/0013960 A1 | 8/2001 | Popovich et al. |
| 2004/0085643 A1 | 5/2004 | Ishikawa et al. |

(Continued)

FOREIGN PATENT DOCUMENTS

| EP | 2 865 555 A1 | 4/2015 |
| EP | 2 960 095 A1 | 12/2015 |

(Continued)

OTHER PUBLICATIONS

Lindlbauer et al (Tracs: Transparency Control of See-Through Displays, Augmented Reality II, UIST'14, Oct. 5, 2014, pp. 654-661) (Year: 2014).*

(Continued)

*Primary Examiner* — Jade R Chwasz
*Assistant Examiner* — Jyotsna V Dabbi
(74) *Attorney, Agent, or Firm* — McCoy Russell LLP

(57) ABSTRACT

A system includes an image realisation device for forming a source image and projection optics for rendering a display image on a display screen, wherein the display image is a virtual image corresponding to the source image. The projection optics have an optical axis, and the image realisation device includes a first image realisation surface at a first distance along the optical axis and a second image realisation surface at a second, different distance along the optical axis. The first and second image realisation surfaces overlap, (Continued)

and the first and second image realisation surfaces include multiple regions, each region switchable between a transparent state and an image realisation state such that the source image may be formed on a region of the first or second image realisation surface and projected through the projection optics to render the display image on the display screen at a first or second apparent depth.

20 Claims, 8 Drawing Sheets

(51) Int. Cl.
  *H04N 13/395* (2018.01)
  *G02B 30/52* (2020.01)
  *H04N 5/74* (2006.01)

(52) U.S. Cl.
  CPC ........... *G02B 30/52* (2020.01); *H04N 13/344* (2018.05); *H04N 13/395* (2018.05); *G02B 27/0101* (2013.01); *G02B 2027/0127* (2013.01); *G02B 2027/0185* (2013.01); *H04N 5/7408* (2013.01)

(58) Field of Classification Search
  CPC .... G02B 2027/0185; G02B 2027/0127; G02B 5/02; G02B 5/0205; G02B 5/0221; G02B 5/0215; G02B 5/0263; G02B 5/0273; G02B 5/0252; H04N 13/344; H04N 13/395; H04N 5/7408; H04N 5/7416
  USPC .......................................................... 359/13
  See application file for complete search history.

(56) References Cited

U.S. PATENT DOCUMENTS

| | | | |
|---|---|---|---|
| 2004/0109136 A1* | 6/2004 | Okamoto | G02B 27/0172 351/211 |
| 2005/0179868 A1 | 8/2005 | Seo et al. | |
| 2008/0018641 A1 | 1/2008 | Sprague et al. | |
| 2008/0265150 A1 | 10/2008 | Holmes | |
| 2013/0242404 A1 | 9/2013 | Kobayashi | |
| 2014/0036374 A1 | 2/2014 | Lescure et al. | |
| 2014/0192281 A1* | 7/2014 | Smithwick | H04N 13/395 345/426 |
| 2015/0061976 A1 | 3/2015 | Ferri | |
| 2015/0222884 A1* | 8/2015 | Cheng | H04N 13/395 348/55 |
| 2016/0124295 A1 | 5/2016 | Montgomery | |
| 2016/0187666 A1 | 6/2016 | Manns et al. | |
| 2016/0209647 A1 | 7/2016 | Fürsich | |
| 2016/0260258 A1 | 9/2016 | Lo et al. | |
| 2016/0277725 A1 | 9/2016 | Ellsworth et al. | |
| 2017/0261746 A1* | 9/2017 | Tam | H04N 13/332 |

FOREIGN PATENT DOCUMENTS

| | | |
|---|---|---|
| WO | WO 2006/061959 A1 | 6/2006 |
| WO | WO 2015/019567 A1 | 2/2015 |
| WO | WO 2015/134738 A1 | 9/2015 |
| WO | WO 2015/173556 A1 | 11/2015 |
| WO | WO 2015/184409 A1 | 12/2015 |
| WO | WO 2016/027706 A1 | 2/2016 |
| WO | WO 2016/052186 A1 | 4/2016 |
| WO | WO 2016/105521 A1 | 6/2016 |

OTHER PUBLICATIONS

Patents Act 1977: Combined Search and Examination Report under Sections 17 and 18(3), UKIPO Application No. GB1620338.2, dated May 30, 2017, 6 pp.
International Search Report and Written Opinion of the International Searching Authority, International Application No. PCT/EP2017/080870, dated May 28, 2018, 22 pp.
Patents Act 1977: Combined Search and Examination Report under Sections 17 and 18(3), UKIPO Application No. GB1620340.8, dated May 30, 2017, 6 pp.
International Search Report and Written Opinion of the International Searching Authority, International Application No. PCT/EP2017/080873, dated Apr. 5, 2018, 16 pp.
Patents Act 1977: Combined Search and Examination Report under Sections 17 and 18(3), UKIPO Application No. GB1620341.6, dated May 12, 2017, 5 pp.
International Search Report and Written Opinion of the International Searching Authority, International Application No. PCT/EP2017/080933, dated Mar. 13, 2018, 16 pp.
Patents Act 1977: Combined Search and Examination Report under Sections 17 and 18(3), UKIPO Application No. GB1620342.4, dated May 15, 2017, 5 pp.
International Search Report and Written Opinion of the International Searching Authority, International Application No. PCT/EP2017/080872, dated Feb. 5, 2018, 14 pp.

\* cited by examiner

MULTI-DEPTH AUGMENTED REALITY DISPLAY

RELATED APPLICATIONS

This application is a 35 U.S.C. § 371 national stage application of PCT Application No. PCT/EP2017/080873, filed on Nov. 29, 2017, which claims priority from Great Britain Patent Application No. 1620340.8, filed on Nov. 30, 2016, the contents of which are incorporated herein by reference in their entireties. The above-referenced PCT International Application was published in the English language as International Publication No. WO 2018/100003 A2 on Jun. 7, 2018.

TECHNICAL FIELD

The present disclosure relates to a 3-D augmented reality display system. Particularly, but not exclusively, the disclosure relates to an apparatus for creating and projecting multi-depth images onto a display, such as a windscreen, for use in a vehicle. Aspects of the invention relate to an apparatus for projecting multi-depth, or 3D images onto a windscreen.

BACKGROUND

Heads-up displays (HUDs) are known displays where images are projected onto a transparent surface, such as a windscreen. Such displays are well known in a number of different environments including in vehicles.

In automotive HUDs information regarding car conditions (speed etc.) or navigation is displayed onto the windscreen. Such displays are typically limited in size and project the image at a fixed depth to the user. Due to the limited size, the HUD may be cluttered with information that is less relevant to the user taking up real estate. Furthermore, as the image is of a fixed depth all information presented to the user is given equally prominence. This further reduces the efficiency of such displays.

A further consideration is that in vehicles there is typically limited physical space in which such systems can be installed. Typically, such systems must be incorporated into existing spaces present in a vehicle, or installed in as small a space as possible to minimise the need to remove and reinstall existing components. Furthermore, in such systems there is a cost associated with the introduction and installation.

SUMMARY OF THE INVENTION

Aspects and embodiments of the invention provide an apparatus as claimed in the appended claims.

According to an aspect of the invention is that there is provided an imaging system for generating multi-depth virtual images on a display screen, the imaging system comprising: an image realisation device for forming a source image, projection optics for rendering a display image on the display screen, wherein the display image is a virtual image corresponding to the source image, the projection optics having an optical axis, and wherein the image realisation device comprises: a first image realisation surface at a first distance along the optical axis from the focal point of the projection optics, a second image realisation surface at a second different distance along the optical axis from the focal point of the projection optics, wherein the first and second image realisation surfaces overlap at least in part, and wherein each of the first and second image realisation surface comprise a plurality of regions, each region being selectively switchable between a transparent state and an image realisation state such that the source image may be selectively formed on a region of the first or second image realisation surface and projected through the projection optics rendering the display image on the screen of the display screen at a first or second apparent depth.

Optionally at least one of the first and second image realisation surface is translatable along the optical axis of the projection optics. By providing an addition range of movement along the optical axis, the distance at which the real image is formed from the focal point of the projection optics may be more finely controlled.

Optionally at least one for the first and second image realisation surface is rotatable/tiltable relative to the optical axis of the projection optics. Introducing a tilt into the image realisation surface allows for images formed on different parts of the surface to be at a continuous range of different distances from the focal point of the projection optics. Thus, by controllably deforming the image realisation surface, the available range and resolution of virtual image depths is increased.

Optionally the display screen is a display of a head-up display.

Optionally the first and second image realisation surface comprise multiple regions, each region being selectively switchable between the transparent state and the image realisation state. This allows for a single image realisation layer to form multiple images and configurations of images at any one time.

The image realisation state may be a diffusive state.

Optionally at least one of the first and second image realisation surface is capable of generating the source image. This eliminates the need for external image generation means, providing for a compact system with fewer components.

Optionally wherein the at least one of the first and second image realisation surface comprises an electroluminescent layer. Such layers are capable of being activated by the application of current, which can be localised, modulated as desired.

Optionally the at least one for the first and second image realisation surface comprises an organic light-emitting diode. These can be used to provide a flexible, multi-colour display.

Alternatively, the imaging system comprises a picture generation unit for generating the source image to be rendered as the display image on the display screen and projecting the source image onto at least one of the first and second image realisation surface. The picture generation unit can account for predictable image distortion or degradation in the system and project a corrected image so as to ensure the quality of the final virtual image. Further, images generated by the picture generation unit will generally spread out with distance, the result being that images formed closer to the picture generation unit (and farther from the projection optics) will be smaller. This compensates for any magnification effect in the projection optics such that all virtual images are displayed on the display screen at a constant size, regardless of the distance at which the corresponding real images were formed on the image realisation surface.

Optionally the image realisation state of at least one of the first and second image realisation surface is an optically diffusive state. This provides a surface on which the images from the picture generation unit can be selectively intercepted and formed.

Optionally the picture generation unit comprises a holographic unit to produce computer generated holograms for forming on the diffuser.

Optionally the picture generation unit comprises a light field unit to produce 3-dimentional light field images for forming on the at least one image realisation surface.

The projection of 3-dimentional images through the imaging system enables such images to be displayed on the display screen with the appropriate varying depth so as to produce a convincing representation of a real object.

Optionally the system further comprises a driver, said driver configured to selectively switch the at least one image realisation surface between the diffusive or transparent state.

Optionally picture generation unit comprises a laser and the driver is configured to work synchronously with the laser.

Optionally the driver is configured to work synchronously with the holographic unit.

Optionally the driver is configured to work synchronously with the light field unit.

Synchronising the control of the state of the image realisation surface with the picture generation unit allows for the picture generation unit to be controlled such that images are only projected to the image forming regions of the image realisation surfaces.

Optionally the picture generation unit, image realisation device and projection optics are arranged along the optical axis of the imaging system. This bypasses the need for any redirecting optics which would otherwise complicate the imaging system as well as increase its overall weight and size.

Optionally the picture generation unit further comprises focussing optics. This allows for addition fine tuning or any necessary redirection of the resulting virtual images on the display screen.

Optionally the imaging system further comprises a third image realisation surface. This provides a further expansion to the range of available virtual image depths.

Optionally it is also possible to use the described invention in scenarios, where non see-through screen is present, as a virtual reality system.

Optionally each image realisation surface is a different size and need not overlap all of the other image realisation surfaces. This allows the image realisation device to have any necessary arrangement as dictated by the requirements and limitations of each specific application.

Optionally the imaging system further comprises an ambient light sensor configured to adjust the brightness of the displayed virtual images. This sensor provides feedback to either the picture generation unit or the image generation layer in order to increase or decrease the brightness of the real images so as to affect the brightness of the corresponding virtual image as required.

Optionally, the imaging system can be activated and deactivated automatically as well as by a human input. This enables the imaging system to self-activate when pertinent information is available, or as and when desired by a user.

According to a further aspect of the invention, there is provided a vehicle comprising an imaging system as described in the preceding aspects.

According to another further aspect of the invention, there is provided method for generating A method of for generating multi-depth virtual images on a display screen, the method comprising: forming a source image with an image realisation device, rendering a display image on the screen, via a projection optics having an optical axis, wherein the display image is a virtual image corresponding to the source image, and wherein the image realisation device comprises: a first image realisation surface at a first distance along the optical axis from the focal point of the projection optics, a second image realisation surface at a second different distance along the optical axis from the focal point of the projection optics, the first and second image realisation surfaces overlapping at least in part, and wherein each of the first and second image realisation surface comprise a plurality of regions, each region being selectively switchable between a transparent state and an image realisation state such that the source image may be selectively formed on a region of the first or second image realisation surface and projected through the projection optics rendering the display image on the screen of the display screen at a first or second apparent depth.

According to a further aspect of the invention is that there is provided an imaging system for generating a multi-depth virtual images on a screen of a head-up display, the imaging system comprising an image realisation device for realising a first image, projection optics for rendering a second image on the screen of the head-up display, wherein the second image is a virtual image corresponding to the first image, the projection optics having an optical axis, and wherein the image realisation device comprises a first image realisation surface at a first distance along the optical axis from the focal point of the projection optics, a second image realisation surface at a second different distance along the optical axis from the focal point of the projection optics, wherein the first and second image realisation surfaces overlap at least in part, and wherein at least of portion of each image realisation surface is switchable between a transparent state and an image realisation state such that the first image may be selectively realised on the first or second image realisation surface and projected through the projection optics rendering the second image on the screen of the head-up display at a first or second apparent depth.

According to a further aspect of the invention is that there is provided an imaging system for generating a multi-depth virtual images on a display screen, the imaging system comprising an image realisation device for realising a first image, projection optics for rendering a second image on the display screen, wherein the second image is a virtual image corresponding to the first image, the projection optics having an optical axis, and wherein the image realisation device comprises a first image realisation surface at a first distance along the optical axis from the focal point of the projection optics, a second image realisation surface at a second different distance along the optical axis from the focal point of the projection optics, wherein the first and second image realisation surfaces overlap at least in part, and wherein at least of portion of each image realisation surface is switchable between a transparent state and an image realisation state such that the first image may be selectively realised on the first or second image realisation surface and projected through the projection optics rendering the second image on the display screen at a first or second apparent depth.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

In an aspect of the invention the apparatus and the display are installed in a vehicle, such as a motor vehicle. Whilst the following description is described with reference to a HUD of a motor vehicle, the disclosure, and concepts described herein are applicable to other forms of HUD (for example those installed on other forms of vehicles or wearable platforms such as helmets or goggles), as well as displays in general.

Particularly, but not exclusively, the disclosure relates to an apparatus for creating and projecting multi-dimensional 3-D augmented reality images onto a display screen, such as a windscreen if it is installed for use in a confined environment such as a vehicle which can be operated on land (on/off road or track), under or over sea, in air or space. The examples can be, but are not limited to, cars, buses, lorries, excavators, exoskeleton suit for heavy-duty tasks, motorcycles, trains, theme park rides; submarines, ships, boats, yachts, jet-skies for see vehicles; planes, gliders for air crafts, spaceships, shuttles for space crafts. Furthermore, the technology can be installed/integrated in a mobile platform such as a driver's/operator's head/eye protection apparatus such as a helmet or goggles. Therefore, any activity, which involves wearing protective helmets/goggles, can benefit from this technology. These can be worn by, but are not limited to, motorcyclist/cyclist, skiers, astronauts, exoskeleton operators, military personnel, miners, scuba divers, construction workers. Moreover, it can be used in a stand-alone environment for game consoles, arcade machines and with a combination of an external 2D/3D display it can be used as a simulation platform. Also, it can be used in institutions and museums for educational and entertainment purposes.

Figure 1:
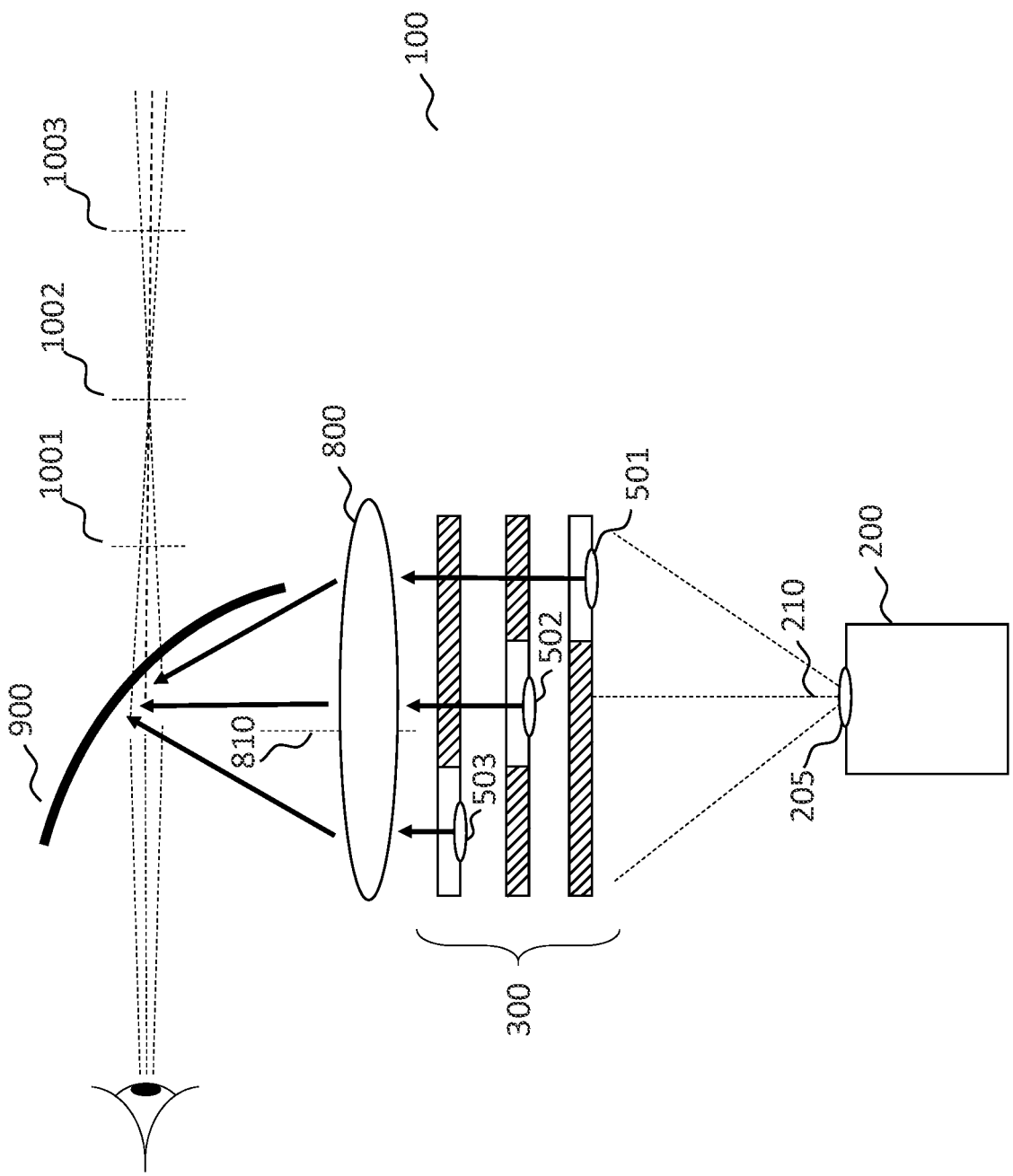
FIG. 1 is a schematic illustration of the apparatus according to an aspect of the invention.

FIG. 1 shows an imaging system 100 made up of a picture generation unit 200 having a projection axis 210. The picture generation unit 200 projects light onto the image realisation device 300. Source images, for example, real images 501-503 are formed in the image realisation device 300 and are subsequently directed through projection optics 800 having optical axis 810 onto the screen 900 of the head-up display to form display images.

The path of the light from the picture generation unit 200, through the image realisation device 300 and the projection optics 800 and onto the screen 900 of the head-up display is referred to as the optical path. The skilled person would understand that any number of intervening reflectors/lens or other optical components may be placed along the optical path between the picture generation unit 200, the image realisation device 300 and the projection optics 800, to manipulate the optical path as necessary (for example, to minimise the overall size of the imaging system 100). Such folding of the optical path to minimise the size of the installation is beneficial in embodiments where the apparatus is installed in a motor vehicle where space is typically constrained.

In use, the real images 501-503 are formed in the image realisation device 300 at different distances from the focal point of the projection optics 800, such that each real image 501-503 results in a virtual image 1001-1003 having a different focus (or perceived depth) visible on the screen 900 of the head-up display.

Figure 2:
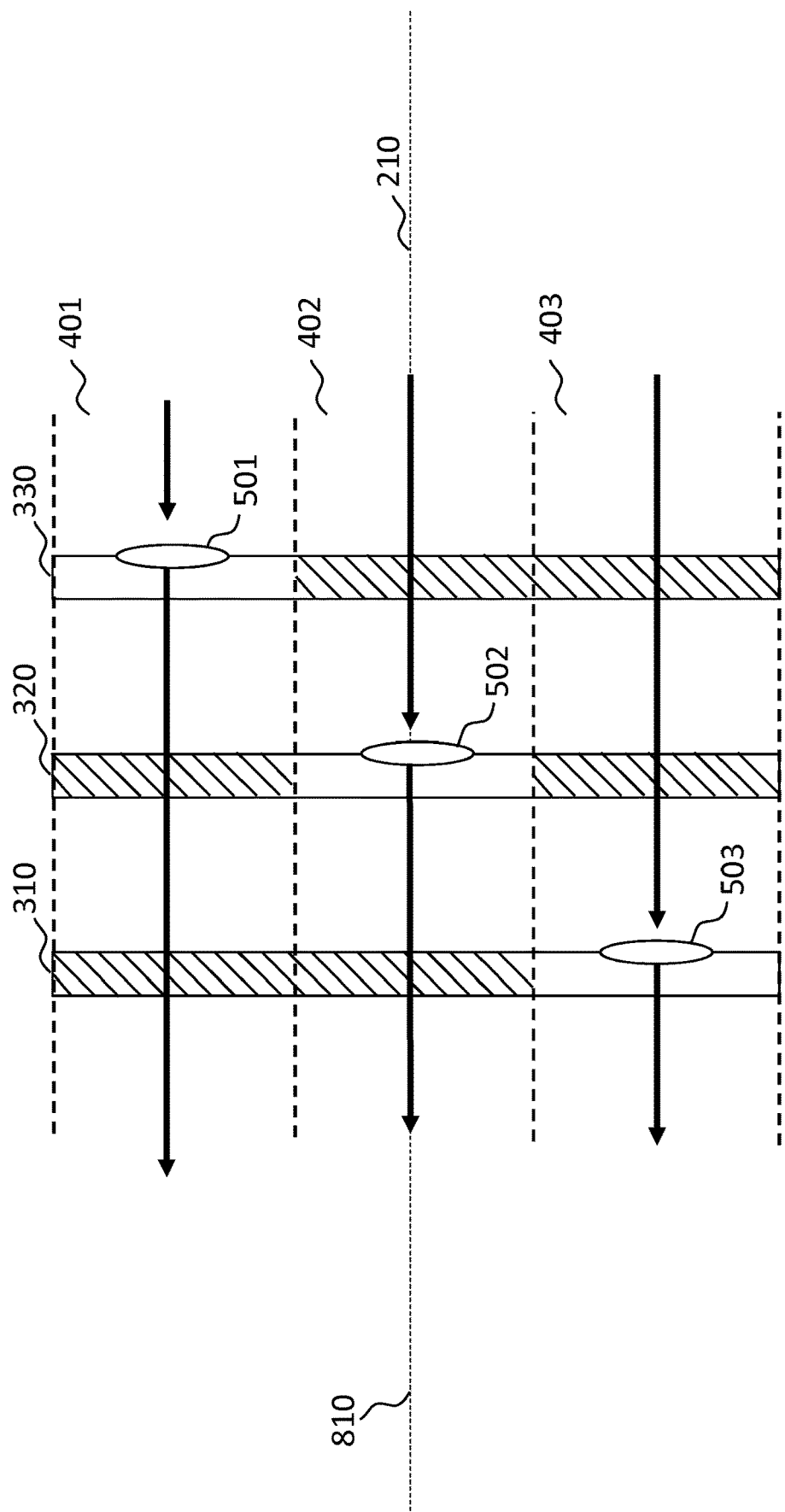
FIG. 2 is a schematic illustration representation of a stacked diffuser image realisation unit.

FIG. 2 shows an embodiment of an image realisation device 300 to be used in conjunction with the apparatus shown in FIG. 1.

In FIG. 2 there shown the image realisation device 300, the image realisation device having three image realisation surfaces 310, 320, 330. In the embodiment shown in FIG. 2 the image realisation surfaces 310, 320, 330 are arranged planar and are distributed along the projection axis 210. Each image realisation surface 310, 320, 330 is centred on the projection axis 210, with its normal parallel to the projection axis 210. Therefore, as shown in FIG. 2 the image realisation surfaces are arranged such that they align along the projection axis 210.

The embodiment shown in FIG. 2, and described in detail is taught in relation to three image realisation surfaces. The skilled person would understand that the precise number of image realisation surfaces 310, 320, 330 is not limited to three, but may be any plurality. Equally, the surfaces need not perfectly align along the optical path as depicted, but may instead be only substantially or partially overlapping. As detailed below it is the use of the spaced realisation surfaces, which allow the image to be selectively formed on a particular surface, which allows for the distance from the focal point of the projection optics to be altered thereby enabling the rendering of the image at different perceived depths on the HUD. This further enables the concurrent display of different images at different perceived depths. In the case where each image corresponds to a portion of a particular object, said object can be made to appear as 3D on the HUD. Accordingly, the invention provides a greater degree of flexibility and control as regards the apparent depth of projected images, by not only controlling an overall apparent depth, but by allowing for the apparent depth of each sub-portion of an image to be varied independently.

In an embodiment, each of the image realisation surfaces 310, 320, 330 is an optical diffuser having a plurality of regions 401-403. Each region of each image realisation device is controllably switchable between a first transparent state and a second optically diffusive state, with the transparent regions 401-403 being depicted by the shaded regions in FIG. 2. In an embodiment, the level of transparency and diffusiveness of a particular region when in the respective transparent or optically diffusive state is controllable, such that a particular level of transparency or diffusiveness can be achieved. In further embodiments any number of regions may be utilised, and together they may make up the entirety or a mere portion of an image realisation surface 310, 320, 330. Individual regions may be uniform in size and shape such that a surface is broken down into regular, addressable regions akin to pixels. Equally, regions may be any individual size and shape as required such that images may be directed towards an appropriate region at a desired depth within the image realisation device 300. Further, neighbouring regions can be collectively controlled thereby effectively providing a single region of greater area. In this manner, the effective extend of each region 401-403 is variable. Optical diffusers having addressable regions which are controllably switchable between a first transparent state and a second optically diffusive sate are known and commercially available. The switching of the individual regions for each of the image realisation surfaces 310, 320, 330 in an embodiment is controlled by a processor (not shown).

The picture generation unit 200 is formed of a light source (for example, a laser) and a spatial light modulator, though the skilled person would appreciate that any suitable imaging means may be used provided they were capable of forming one or more images on the image realisation surfaces 310, 320, 330. Accordingly, in an embodiment the picture generation unit 200 is a holographic unit which produces computer generated holograms for forming on the image realisation surfaces. In an alternative embodiment, the picture generation unit 200 is a light field unit to produce 3-dimentional light field images for forming on the image realisation surfaces.

In an embodiment, the picture generation unit 200 further includes imaging optics for manipulating the real images 501-503 onto the relevant region of the image realisation device 300.

The projection optics 800 are formed of a Fresnel lens, though any suitable focussing optics may be employed. Fresnel lenses are preferred as they are low cost and furthermore require less space than other lenses.

In operation, the picture generation unit 200 projects a series of real images 501-503 towards the image realisation surfaces 310, 320, 330.

The regions 401-403 of the image realisation surfaces 310, 320, 330 comprises regions that are in a transparent state. As the regions are in a transparent state they allow the real images 501-503 to pass through to the next image realisation means 310, 320, 330 along the optical path.

The real images 501-503 are formed on the regions 401-403 of the image realisation surfaces 310, 320, 330 that are in an optically diffusive state.

In the illustrated embodiment of FIG. 2, region 401 of image realisation layer 330 is in an optically diffusive mode, and realises real image 501 at a first distance from the focal length of the projection optics 800 (not shown).

Region 402 of image generation layers 310 and 330 are in the transparent state, allowing real image 502 to be formed on region 402 of image generation layer 320, at a second distance from the length of the projection optics 800.

Due to the arrangement of the image realisation surfaces 310, 320, 330 along the optical path, a real image 501-503 formed on a particular image realisation surface 310, 320, 330 is at a different distance from the focal point of the projection optics 800 than a real image 501-503 formed on a different image realisation surface 310, 320, 330. Therefore, when directed on to the screen 900 of the head-up display via the projection optics 800, each real image 501-503 appears as a virtual image 1001-1003 having a distinct level of focus (or perceived depth).

Therefore, the arrangement shown in FIG. 2 allows focal length to be controlled at discrete intervals i.e. as determined by the separation of the image realisation surfaces 310, 320, 330. This allows for the generation of the virtual images 1001-1003 at different depths thus providing a multi-dimensional or 3-D image.

Figure 3:
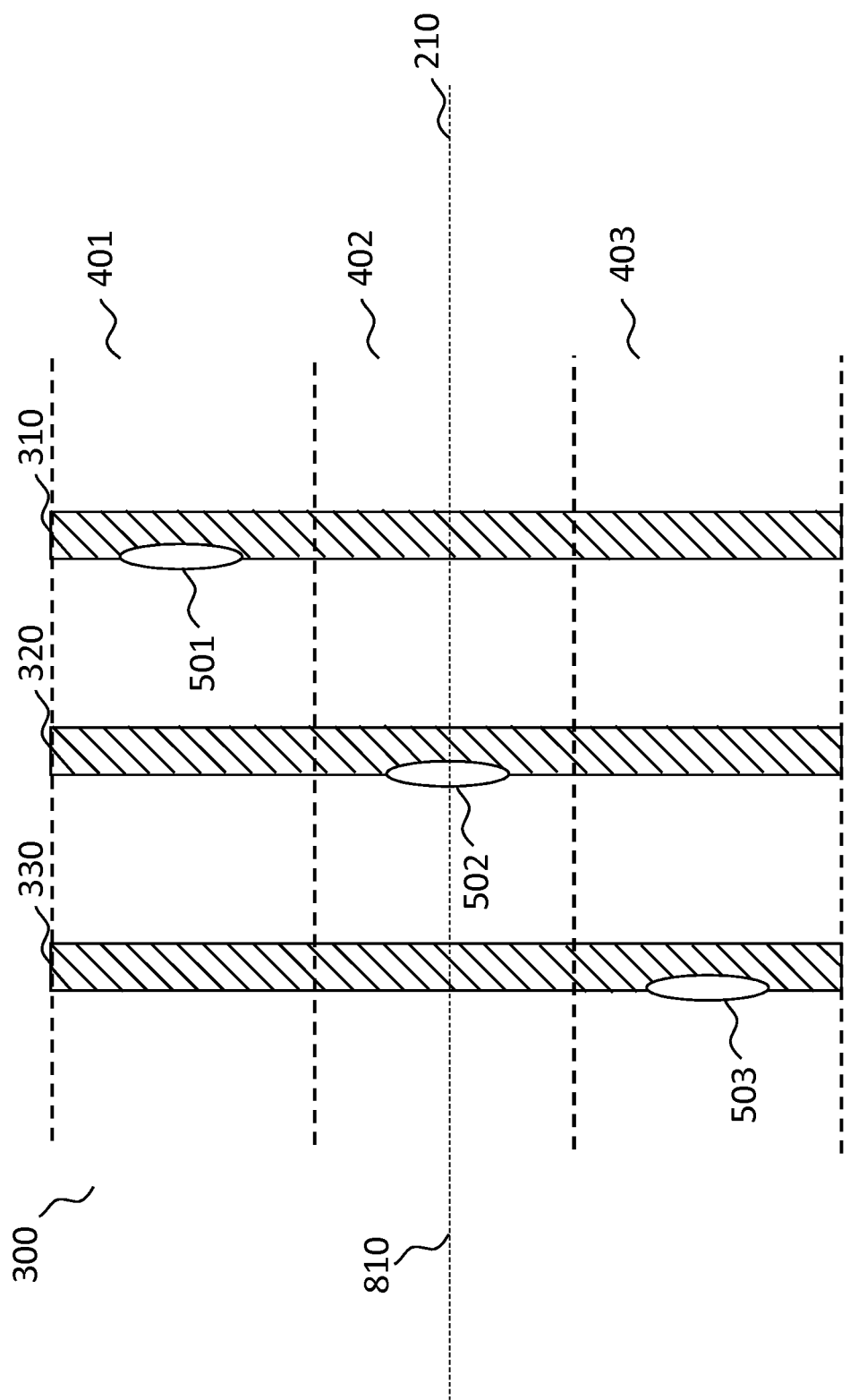
FIG. 3 is a schematic illustration representation of an image generating image realisation unit.

FIG. 3 depicts an alternative embodiment in which each of the image realisation surfaces 310, 320, 330 is an image generation layer.

In FIG. 3 there is shown the image realisation device 300, the image realisation device having three image realisation surfaces 310, 320, 330. In the embodiment shown in FIG. 3 the image realisation surfaces 310, 320, 330 are arranged planer and are distributed along the projection axis 210. Each image realisation surface 310, 320, 330 is cantered on the projection axis 210, with its normal parallel to the projection axis 210. Therefore, as shown in FIG. 2 the image realisation surfaces are arranged such that they align along the projection axis 210.

In an embodiment, the image generation layer 350 is an electroluminescent OLED, though any suitable image generation means may be employed. This allows for operation without the picture generation unit 200, reducing the overall size and component number of the imaging system 100.

As with the optical diffuser embodiment, each of the image realisation surfaces 310, 320, 330 has a plurality of regions, 401-403, each region being controllably switchable between a first transparent state and a second image generation state. For clarity three regions 401-403, though in further embodiments the number of regions may be any number more than two.

In use, each region of the image realisation surface 310, 320, 330 is switchable between an active state (in which the region generates an image) and a transparent state. Each region generates a real image 501-503 in a different region 401-403. The non-image generating regions 401-403 of each image realisation surface 310, 320, 330 are selectively placed in a transparent state, enabling any real images 501-503 preceding them on the optical path to be transmitted through to the projection optics 800.

Each real image 501-503 is generated on an image realisation surface 310, 320, 330 at a different distance from the focal point of the projection optics 800 with each real image 501-503 projected onto the screen 900 of the head-up display appearing as a virtual image 1001-1003 having a distinct level of focus (or perceived depth).

In an alternative embodiment, one or more image generation layers 350 may be interleaved between one or more optical diffusers to provide a hybrid embodiment with two modes of operation, wherein each mode may be adapted to operate in different range of ambient light conditions. Further, the overlaying of the optical diffuser 400 and image generation layer 350 is this way allows for a dual mode system without requiring a second set of projection optics 800.

In an embodiment switching the image realisation surface between the active and transparent states is controlled by a driver. In a further embodiment, the driver may also control the picture generation unit 200 such that the picture generation unit 200 is selectively deactivated when an image generation layer 350 is present and active.

Accordingly, the configuration shown in FIG. 3, like the configuration shown in FIG. 2, allows for the distance between the real image and the focal point of the projection optics to be controlled at discrete intervals i.e. as determined by the separation of the image realisation surfaces. Therefore, the depth of the images can be controlled.

Figure 4:
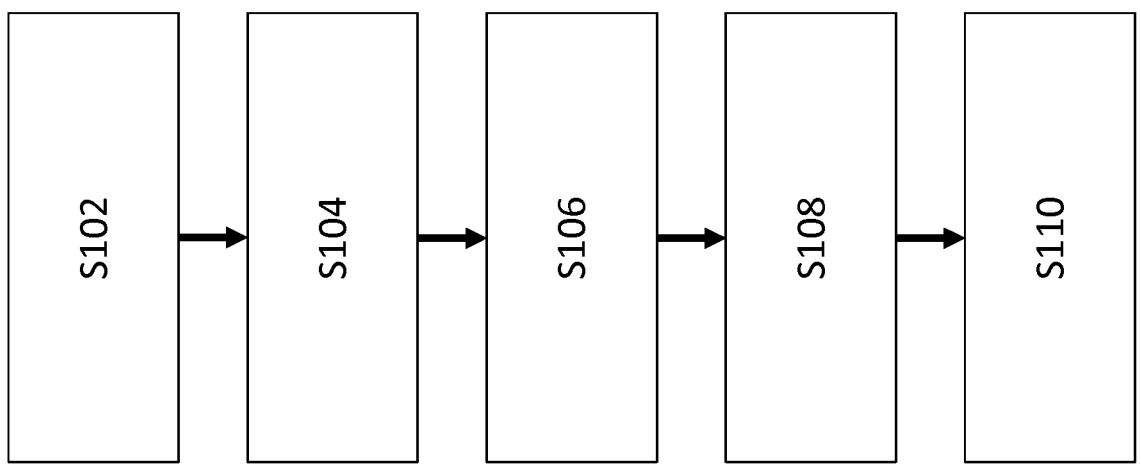
FIG. 4 is a flow chart of the process for generating the image to be rendered on the screen of the head-up display.

FIG. 4 is a flow chart of the process for generating the image to be rendered on the screen of the head-up display.

In an aspect of the invention the apparatus generates a virtual image which is displayed on the HUD, the HUD being a windscreen of the vehicle. As is known the windscreen of a vehicle is a geometrically distorted shape i.e. it is not flat. Accordingly, an image that is projected onto the windscreen will be distorted, the level of distortion being affected by various factors such as the shape of the windscreen, and the average distance of the windscreen from the projected image.

The apparatus described herein is able to generate an image which can be presented at various depths. Whilst the generation of the images at multiple depths on the HUD provides many advantages over a flat, single depth, image the ability to correct for factors such as the curvature of the windscreen results in further improvements in terms of depth control and image manipulation.

Advantageously in order to reduce the effect of the distortion in an aspect of the invention the windscreen distortion is corrected for by the image generation unit using software to pre-distort the image such that the image rendered on the windscreen is free from any distortions created by the windscreen. Such a software based correction eliminates the need for bulky correction optics and furthermore provides a higher degree of flexibility which can adapt to different windscreens.

The images to be presented on the HUD are generated by a picture generation unit. The picture generation unit defining the image to be displayed by the HUD. By way of example the image may comprise information regarding the car conditions and further information relating to navigation.

The term picture generation unit refers to the apparatus which determines and generates the base image to be rendered on the HUD. The process described herein is applicable to any suitable form of picture generation apparatus.

The picture generation unit comprises an image source which generates the image to be displayed on the HUD. The image source in an embodiment is a light engine, or OLED display or any suitable source which generates the image to be displayed. The image source comprises a software driver configured to determine and generate the image on the image source.

The software driver comprises a component which determines the content to be displayed. The process of the generation of content is known and in an aspect is performed using known means.

The driver further comprises a distortion module, the distortion module configured to apply a distortion to the generated image, the distortion calculated such that when the image is displayed on the HUD/windscreen the image appears undistorted to the end user.

At step S102 the windscreen is modelled as a mirrored surface. At step S102 the shape and gradient of the windscreen is determined. In an embodiment, as the shape of the windscreen is typically constant for a particular make and model of a vehicle it is pre-programmed.

At step S104 the image to be displayed on the HUD is taken as reference input image. Such an image will typically change several times per second.

At step S106 the input image is separated for each colour channel of the image to create an image per colour channel.

At step S108 for each colour channel image, for each pixel of the image the position of the pixel as visualised by a viewer located at a distance away from the windscreen surface is determined. This is determined by using ray reflection in order to determine the position of the pixel based on the average distance of the input pixel (as per step S106) the reflection surface of the windscreen (as per step S102) and the average distance between the rendered image and the windscreen, the image depth.

Therefore, at step S108 the level of distortion for each colour channel image, as a result of the windscreen and the physical distances, is calculated. This results in a distorted image (with the level of distortion being dependent on the physical parameters) for each colour channel. This can be achieved by monitoring the displacements of certain pre-defined points on a distorted image and fitting them to obtain the related distortion parameters.

At step S110 the individual distorted colour channel images are combined. The combined image is the resultant pre-distortion image as the projection of the pre-distortion image will result in the input image (as per step S104) being displayed.

As such the process provides an improved methodology for ensuring that the generated image is free from distortion.

Diffuser stacks can be arranged with their normal not parallel to the projection axis.

Figure 5:
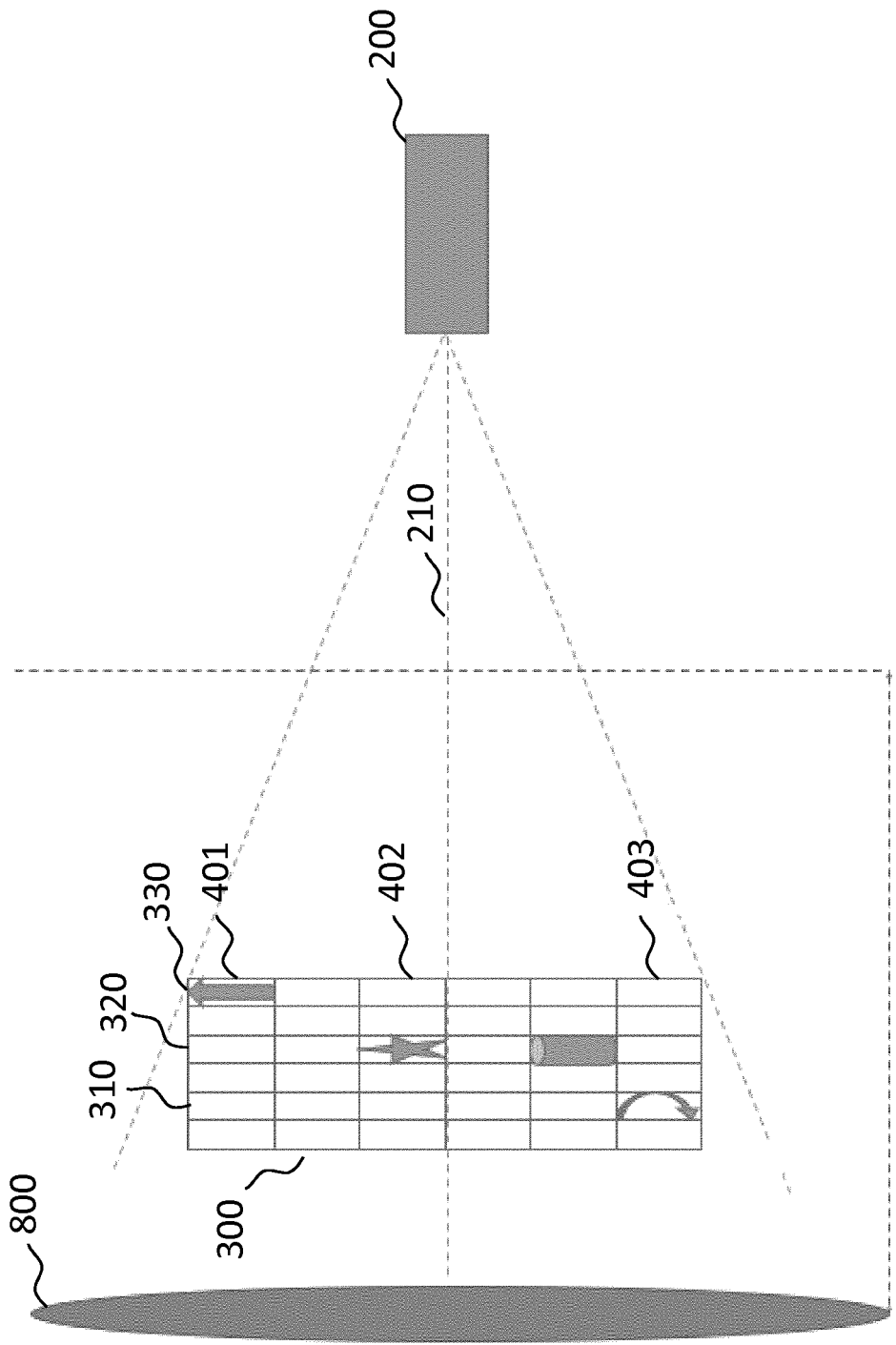
FIG. 5 is a schematic illustration of the apparatus according to an aspect of the invention.
Figure 6:
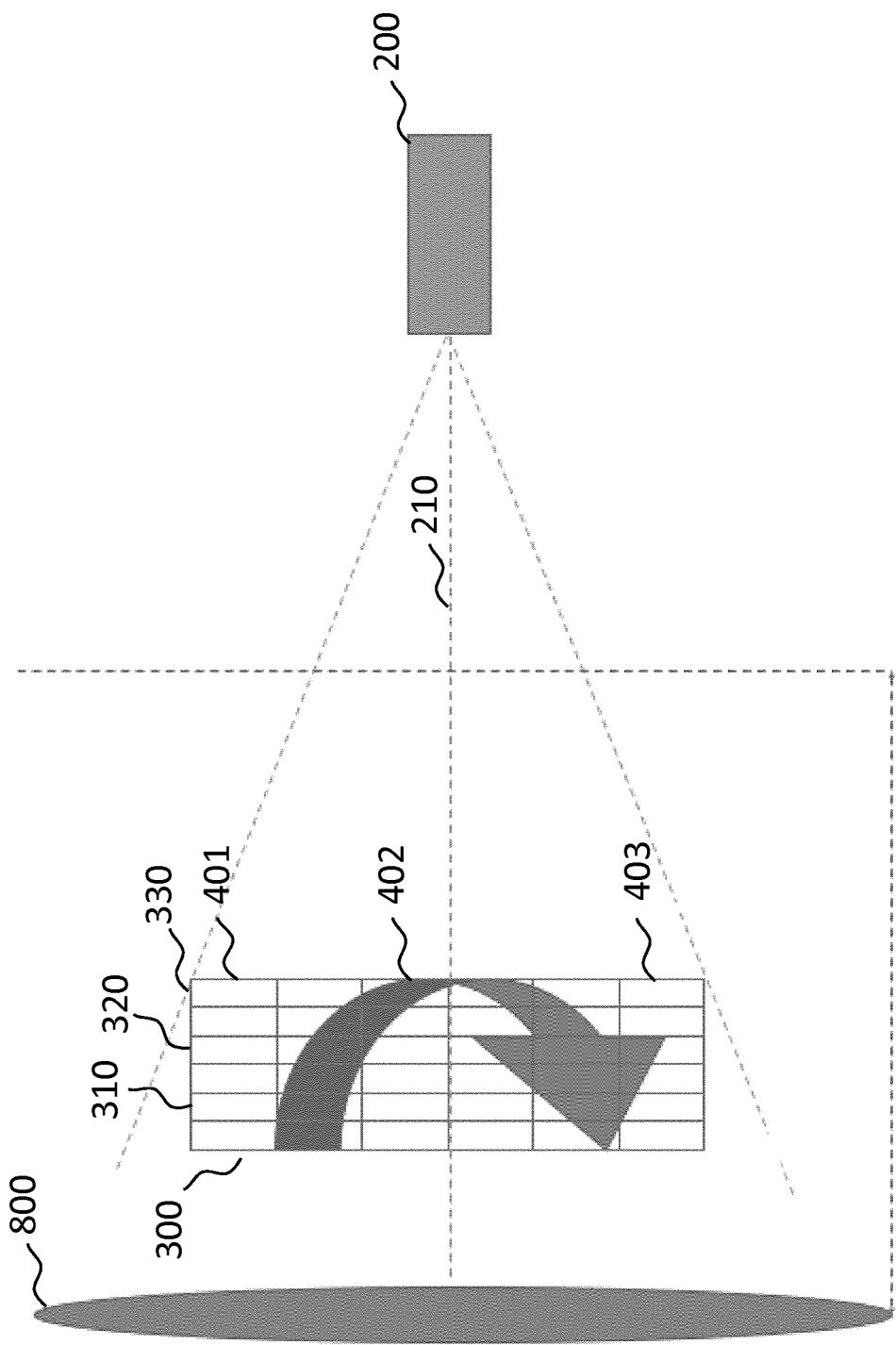
FIG. 6 is a schematic illustration of the apparatus according to an aspect of the invention.
Figure 7:
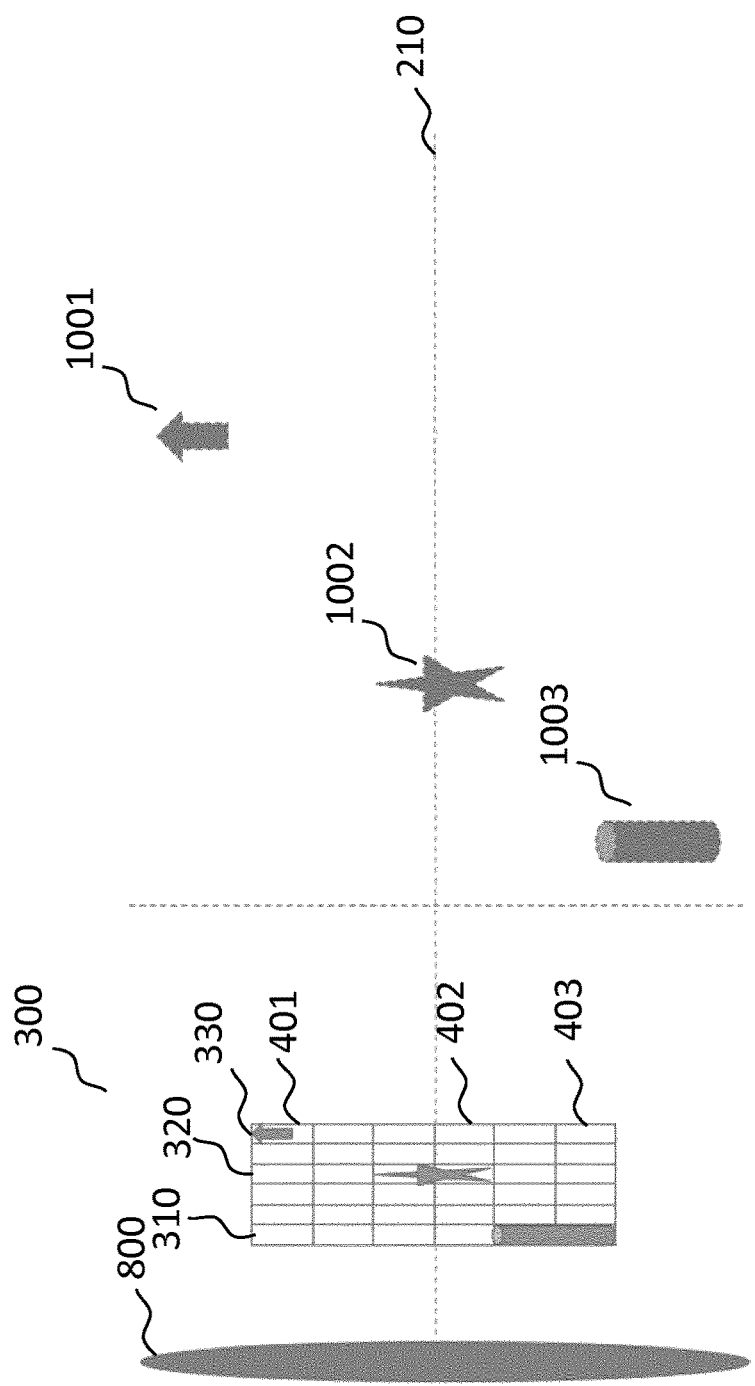
FIG. 7 is a schematic illustration of the apparatus according to an aspect of the invention.

FIGS. 5, 6 and 7 depict further applications and embodiments according to an aspect of the invention.

The apparatus shown in FIGS. 5, 6 and 7 utilise the same principles as the apparatus shown in FIGS. 1, 2 and 3 where the reference numerals refer to the same features as defined in FIGS. 1, 2 and 3.

FIG. 5 shows an embodiment in which multiple real images are formed on the same image realisation surface 310, 320, 330 but on different regions 402-403 (the star and the cylinder). Accordingly, these images are realised at the same distance from the focal point of the projection optics 800 and when projected onto the screen have produce virtual images with the same perceived depth. At the same time, each region of each layer is capable of adopting a different level of transparency or diffusiveness as desired, thereby allowing for real images formed on a common layer to be independently controlled. This provides for a greater degree of flexibility and control of the resulting virtual images than would otherwise be the case with image realisation surfaces that did not have such independently controlled regions 401-403.

FIG. 6 illustrates an application whereby different portions of an overall image are formed on different regions 401-403 of each image realisation surface 310, 320, 330, thereby having a range of distances from the focal point of the projection optics 800, and the resulting virtual images being at a range of apparent depths. This allows for the generation of a 3D representation of a larger object, in this case an arrow having a varying apparent depth along its length. This further illustrates how a portion of an image can be maintained whilst other portions are manipulated. Moreover, as well as changing the apparent depth across an image, the variable transparency and diffusiveness of each region 401-403 of each image realisation surface can be independently modulated so as to (for example) create a fade-out effect.

FIG. 7 depicts an embodiment in which a laser projector is used. Such a set up implies that the virtual images are always in focus, with their size depending on the distance of the image realisation device 300 from the projector output, as result of the spread of the laser projector beam. Accordingly, real images of different sizes can be formed on different surfaces 310, 320, 330 of the image realisation device 300 such that the resulting virtual images are then the same size. As a result, no further optics are necessary to magnify (or demagnify) the virtual images, thereby reducing both the component count and volume of the HUD system.

Figure 8:
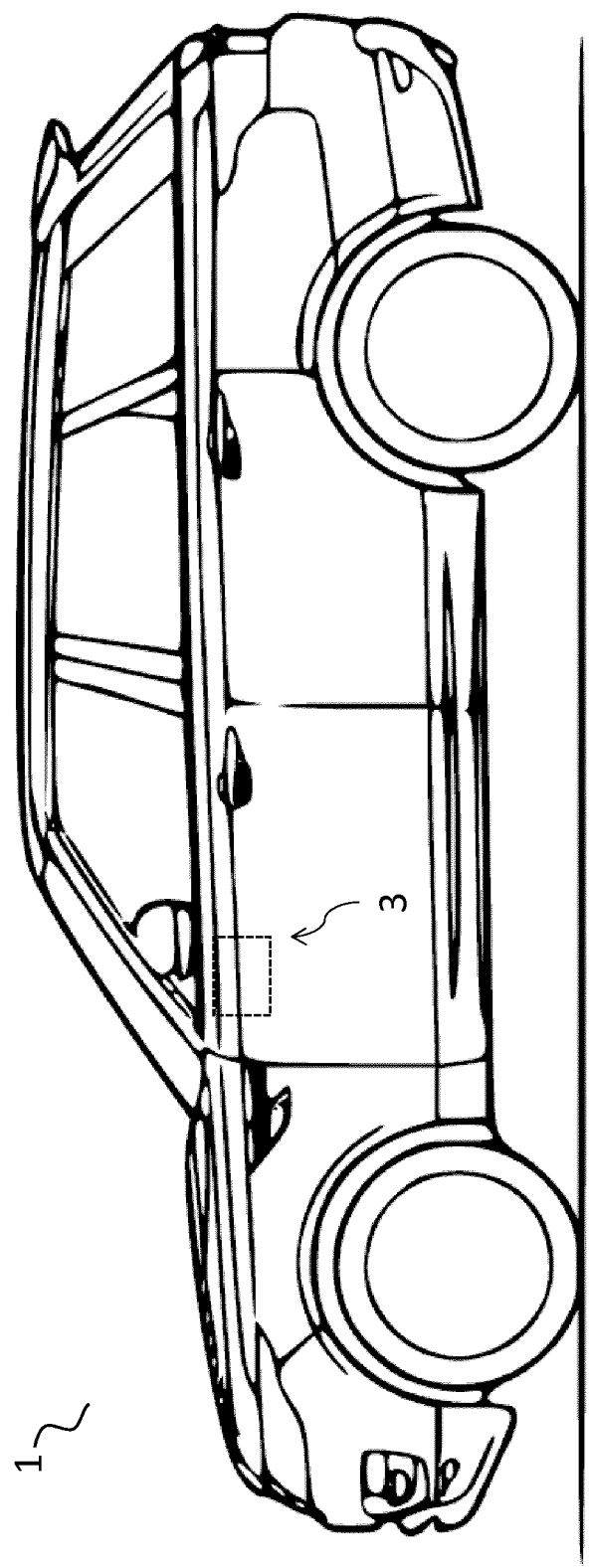
FIG. 8 is a vehicle according to an embodiment of the invention.

FIG. 8 illustrates a vehicle 1 comprising the apparatus 3 of FIGS. 1 to 4 and 5 to 7. The apparatus 3 may be embodied in an imaging system.

The invention claimed is:

1. An imaging system for generating multi-depth virtual images on a display screen, the imaging system comprising:
   an image realisation device for forming a source image; and
   projection optics for rendering a display image on the display screen, wherein the display image is a virtual image corresponding to the source image, the projection optics having an optical axis, and
   wherein the image realisation device comprises:
      a first image realisation surface at a first distance along the optical axis from a focal point of the projection optics, and
      a second image realisation surface at a second different distance along the optical axis from the focal point of the projection optics,
      wherein the first and second image realisation surfaces overlap at least in part, and
      wherein each of the first and second image realisation surfaces comprises a plurality of independently controlled regions, each independently controlled region being selectively switchable between a transparent state and an image realisation state such that the source image may be selectively formed on a region of the first or second image realisation surface and projected through the projection optics rendering the display image on the display screen at a first apparent depth or a second apparent depth, and wherein an extent of each of the plurality of regions of the first and second image realisation surfaces is variable.

2. The imaging system according to claim 1, wherein at least one of the first and second image realisation surfaces is translatable along the optical axis of the projection optics.

3. The imaging system according to claim 1, wherein at least one of the first and second image realisation surfaces is rotatable and tiltable relative to the optical axis of the projection optics.

4. The imaging system according to claim 1, wherein the display screen is a display of a head-up display.

5. The imaging system according to claim 1, wherein at least one of the first and second image realisation surfaces is capable of generating the source image.

6. The imaging system according to claim 1, further comprising a picture generation unit for generating the source image to be rendered as the display image on the display screen and projecting the source image onto at least one of the first and second image realisation surfaces.

7. The imaging system according to claim 6, wherein the image realisation state of at least one of the first and second image realisation surfaces is an optically diffusive state.

8. The imaging system according to claim 6, wherein the picture generation unit comprises a holographic unit to produce computer generated holograms to form holographic images on the first and second image realisation surfaces.

9. The imaging system according to claim 6, wherein the picture generation unit comprises a light field unit to produce 3-dimensional light field images for forming on the first and second image realisation surfaces.

10. The imaging system according to claim 6, further comprising a driver, said driver configured to selectively switch at least one of the first and second image realisation surfaces between the diffusive or transparent state.

11. The imaging system according to claim 10, wherein the picture generation unit comprises a laser and the driver is configured to work synchronously with the laser.

12. The imaging system according to claim 10, wherein the picture generation unit comprises a holographic unit to produce computer generated holograms to form holographic images on the first and second image realisation surfaces and the driver is configured to work synchronously with the holographic unit.

13. The imaging system according to claim 10, wherein the picture generation unit comprises a light field unit to produce 3-dimensional light field images for forming on the first and second image realisation surfaces and the driver is configured to work synchronously with the light field unit.

14. The imaging system according to claim 6, wherein the picture generation unit, image realisation device and projection optics are arranged along an optical path of the imaging system.

15. The imaging system according to claim 6, wherein the picture generation unit further comprises focussing optics.

16. The imaging system according to claim 6, wherein the picture generation unit is configured to generate an input image to be rendered on the display screen as a second image, wherein the input image is adjusted to compensate for any distortion due to the display screen.

17. The imaging system according to claim 1, further comprising one or more additional image realisation surfaces.

18. The imaging system according to claim 1, wherein each image realisation surface is a different size.

19. A vehicle comprising the imaging system of claim 1.

20. A method of generating multi-depth virtual images on a display screen, the method comprising:
   forming a source image with an image realisation device,
   rendering a display image on the display screen, via a projection optics having an optical axis, wherein the display image is a virtual image corresponding to the source image, and
   wherein the image realisation device comprises:
      a first image realisation surface at a first distance along the optical axis from a focal point of the projection optics, and
      a second image realisation surface at a second different distance along the optical axis from the focal point of the projection optics,
      the first and second image realisation surfaces overlapping at least in part, and
   wherein each of the first and second image realisation surfaces comprises a plurality of independently controlled regions, each independently controlled region being selectively switchable between a transparent state and an image realisation state such that the source image may be selectively formed on a region of the first or second image realisation surface and projected through the projection optics rendering the display image on the display screen at a first apparent depth or a second apparent depth, and wherein an extent of each of the plurality of regions of the first and second image realisation surfaces is variable.

* * * * *